Sept. 14, 1926.  W. C. RANDOLPH  1,600,137
EXPANSIBLE PLUG FOR PIPE FITTINGS
Filed Dec. 1, 1924
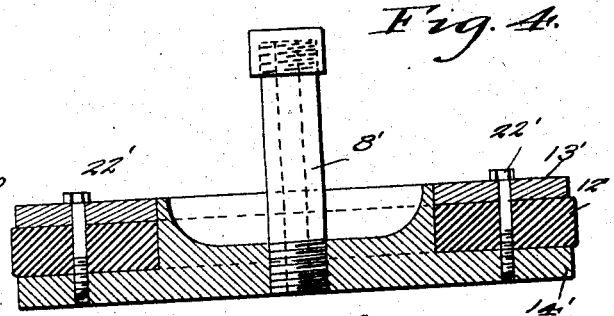
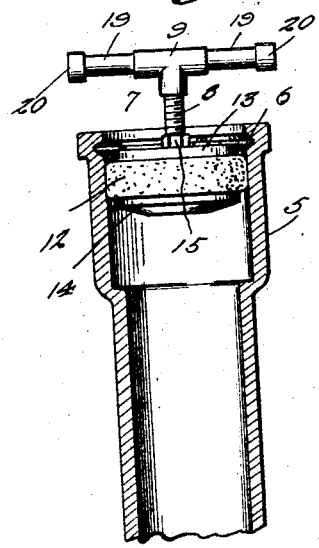
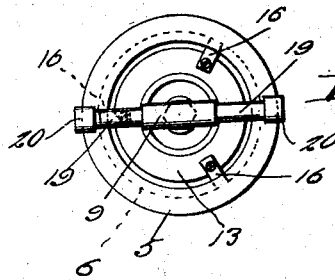
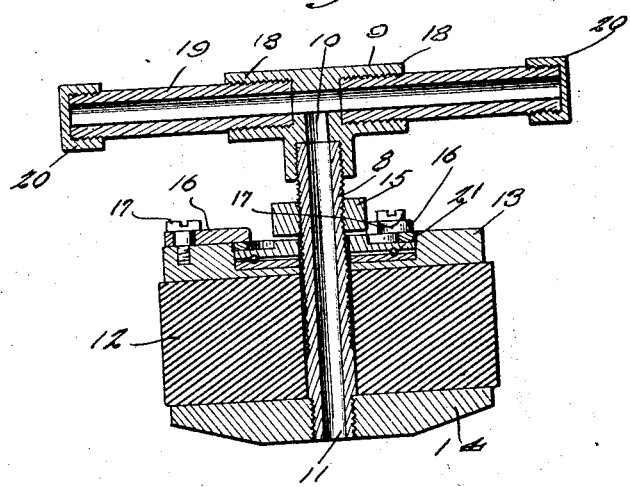
INVENTOR
W. C. Randolph
BY Victor J. Evans
ATTORNEY Patented Sept. 14, 1926.

1,600,137

UNITED STATES PATENT OFFICE.

WILLIAM COUTS RANDOLPH, OF ATLANTA, GEORGIA.

EXPANSIBLE PLUG FOR PIPE FITTINGS.

Application filed December 1, 1924. Serial No. 753,276.

This invention relates to new and useful improvements in plugs and more particularly to what will be hereinafter known as an expansible plug, the main object of the present invention being the provision of a plug which may be readily and quickly applied to the end of pipe lines, fire hydrants, valves and other end fittings in order to make proper pressure tests on said pipe lines, fittings and the like.

The essential characteristics of the invention resides in the provision of a device of the above stated character wherein provisions are made for preventing the dislodgement of the expansion plug from the pipe fitting during the operation of making the pressure tests.

A further object of the invention resides in the provision of a hollow stud having communicating with the upper end thereof hollow nipples, the latter being provided with closure caps, the purpose of the closure caps facilitating in gaining access to the nipples when the pressure tests are to be made.

With the above and other objects in view the invention further includes the following novel features and details of construction to be hereinafter more fully described, illustrated in the accompanying drawings and pointed out in the appended claim.

Figure 1 is a vertical sectional view of one end of the bell end of a cast iron pipe, illustrating the expansible plug applied therein.

Figure 2 is a top plan view.

Figure 3 is a detail vertical section, on an enlarged scale, of the expansible plug removed from the pipe fitting and clearly illustrating the pressure testing means.

Figure 4 is a sectional view illustrating a slight modified form of expansible plug.

Referring more particularly to the accompanying drawings wherein like characters of reference denote corresponding parts, 5 denotes the upper end of a cast iron pipe, 6 the groove formed in the upper end thereof and customarily utilized to receive lead when the anchoring of a joint thereto is to be made, but in the present invention it will be obvious that the groove is used for a different purpose.

The testing plug generally denoted by the character 7 comprises a hollow exteriorly threaded stud 8 having connected to the upper end thereof a hollow T-joint 9, the passage 10 in said T-joint communicating with the bore 11 of the stud. 12 indicates a thick rubber disk made of spring or cushion rubber positioned loosely on the stud 8 and disposed between an upper metal disk 13 and a lower metal disk 14. The disk 13 is retained in clamping relation on the stud 8 through the medium of a clamping nut 15.

Upon the insertion of the expansible plug 7 within the bell end of the cast iron pipe line, 5, and to guard against the displacement of such from the pipe during the pressure test, the pivoted locks 16 are swung until the free extremities thereof engage in the groove 6 of the pipe 5. These locking members 16 are preferably pivotally mounted on the upper face of the uppermost metal disk 13 through the medium of studs 17, for convenience in the operation of such. Threaded in each of the sockets 18 of the T-joint or head 9 is a hollow nipple 19 communicating with the passage 10 of the plug, and the free end of each nipple is closed through the medium of a threaded cap 20.

It is to be understood that the invention will of course be made of different sizes to suit the size of the pipe or fittings being tested, and in the operation of the device, and after the expansible plug has been properly inserted in the bell end of the cast iron pipe 5, the locking members 16 swing to engage in the groove 6, to prevent the expansible plug from creeping until the test is made, one of the caps 20 is then removed from its nipple, and obviously it will be appreciated the convenience afforded when making the proper pressure tests when found compulsory to first close the outlet of the pipe or fittings to be tested.

I have found it to be advantageous, and to assist in the operation of the device, to employ a ball thrust bearing 21 defined in a recess in the uppermost disk 13 and disposed therebetween and the lock nut 15, and this thrust bearing aids also in the manipulation of the lock nut 15.

The construction illustrated in Figure 4 departs from the preferred embodiment, to the end of being especially adapted for use in association with large sized plugs. The character 14 denotes a lower metal member carried by the stud 8′, while loosely fitting on the stud 8′ is an upper metal member or ring 13′. Positioned between the said metal members is a rubber ring or expansible member 12′. Suitable fastening means, indicated by the character 22′, are employed for clamping the upper metal member or ring 13' and the rubber ring 12' to the lower metal member or disk 14'.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention what I claim as new is:—

A testing plug for pipes comprising a hollow threaded stud, a pair of superimposed metal disks mounted on said plug, an expansible disk loosely mounted on the stud and disposed between said metal disks, clamping means for the disk and plug, anti-friction means between the clamping means and upper disk and being disposed in a recess in said upper disk and a plurality of pivoted locking members carried by the upper metal disk and adapted to be swung on their pivots to enter a groove in the upper end of the pipe into which the expansible plug is inserted to prevent displacement of the plug from the pipe during the tests.

In testimony whereof I affix my signature.

WILLIAM COUTS RANDOLPH.